(12) United States Patent
Strock et al.

(10) Patent No.: US 10,183,312 B2
(45) Date of Patent: Jan. 22, 2019

(54) ABRASIVE BLADE TIP TREATMENT (71) Applicant: United Technologies Corporation, Hartford, CT (US)

(72) Inventors: Christopher W. Strock, Kennebunk, ME (US); Changsheng Guo, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 292 days.

(21) Appl. No.: 14/706,369

(22) Filed: May 7, 2015

(65) Prior Publication Data

US 2015/0337671 A1 Nov. 26, 2015

Related U.S. Application Data (60) Provisional application No. 62/002,251, filed on May 23, 2014.

(51) Int. Cl.
*B05D 5/00* (2006.01)
*F01D 11/12* (2006.01)
*B23K 1/00* (2006.01)
*C09K 3/14* (2006.01)
*B05D 3/02* (2006.01)
*B23K 1/005* (2006.01)
*B23K 1/19* (2006.01)
(Continued)

(52) U.S. Cl.
CPC .............. *B05D 5/00* (2013.01); *B05D 3/0254* (2013.01); *B22F 3/1055* (2013.01); *B23K 1/0018* (2013.01); *B23K 1/0056* (2013.01); *B23K 1/19* (2013.01); *B23K 26/34* (2013.01); *B23K 35/3033* (2013.01); *B23K 35/3046* (2013.01); *B23K 35/3053* (2013.01); *C09K 3/14* (2013.01); *C22C 26/00* (2013.01); *C22C 29/065* (2013.01); *C22C 29/12* (2013.01); *F01D 11/122* (2013.01); *B22F 5/04* (2013.01); *B22F 7/08* (2013.01); *B23K 2101/001* (2018.08); *B23K 2103/50* (2018.08); *F05D 2230/31* (2013.01); *Y02P 10/295* (2015.11); *Y02T 50/672* (2013.01); *Y10T 428/2438* (2015.01); *Y10T 428/24388* (2015.01)

(58) Field of Classification Search
CPC ............................... F01D 11/122; F01D 5/288
See application file for complete search history.

(56) References Cited

U.S. PATENT DOCUMENTS 4,008,844 A   2/1977 Duvall et al.
4,689,242 A   8/1987 Pike
(Continued)

FOREIGN PATENT DOCUMENTS

GB      2475850 A      6/2011
WO  2012152461 A1   11/2012

OTHER PUBLICATIONS

European Search Report dated Dec. 14, 2015, for corresponding European Application No. 15168165.7.

*Primary Examiner* — Carlos A Rivera
*Assistant Examiner* — Danielle M. Christensen
(74) *Attorney, Agent, or Firm* — Kinney & Lange, P.A.

(57) ABSTRACT

An abrasive coating for a metal airfoil tip in a gas turbine engine may include a plurality of grit particles coated with a braze alloy material and configured for attachment to the airfoil tip. The braze alloy may be a nickel base, cobalt base or iron base braze alloy or mixtures thereof, or a titanium base braze alloy.

6 Claims, 5 Drawing Sheets

(51) Int. Cl.
*B23K 26/34* (2014.01)
*B22F 3/105* (2006.01)
*C22C 26/00* (2006.01)
*C22C 29/06* (2006.01)
*C22C 29/12* (2006.01)
*B23K 35/30* (2006.01)
B22F 5/04 (2006.01)
B22F 7/08 (2006.01)
B23K 101/00 (2006.01)
B23K 103/00 (2006.01)

(56) References Cited

U.S. PATENT DOCUMENTS

| | | | | |
|---|---|---|---|---|
| 5,997,248 A | * | 12/1999 | Ghasripoor | F01D 11/12 415/173.4 |
| 6,503,349 B2 | | 1/2003 | Pietruska et al. | |
| 7,966,707 B2 | | 6/2011 | Szela et al. | |
| 7,997,865 B1 | * | 8/2011 | Liang | F01D 5/20 416/92 |
| 8,266,801 B2 | | 9/2012 | Clark et al. | |
| 2003/0183529 A1 | * | 10/2003 | Ohara | C23C 6/00 205/109 |
| 2004/0091627 A1 | * | 5/2004 | Ohara | B23K 1/0018 427/402 |
| 2008/0166225 A1 | * | 7/2008 | Strangman | C23C 26/02 415/173.4 |
| 2009/0283503 A1 | * | 11/2009 | Schreiber | B23K 1/0018 219/121.64 |

* cited by examiner

ABRASIVE BLADE TIP TREATMENT

CROSS-REFERENCE TO RELATED APPLICATION

This application claims the benefit of U.S. Provisional Application No. 62/002,251 filed May 23, 2014 for "Abrasive Blade Tip Treatment" by Christopher W. Strock and Changsheng Guo.

BACKGROUND

Gas turbine engines include compressor rotors having a plurality of rotating compressor blades. Minimizing the leakage of air, such as between tips of rotating blades and a casing for a gas turbine engine, increases the efficiency of the gas turbine engine because the leakage of air over the tips of the blades can cause aerodynamic efficiency losses. To minimize this, the gap at tips of the blades is set small and, at certain conditions, the blade tips may rub against and engage in an abradable seal at the casing of the engine. The abradability of the seal material prevents damage to the blades while the seal material itself wears to generate an optimized mating surface and thus reduce the leakage of air.

Desirable features of an abradable seal include low gas permeability, low roughness, and sufficient erosion resistance to generally maintain dimensions over time while remaining abradable during interaction with blades. These factors give rise to abradable seals which are hard, dense, and formed from abrasive blade tip treatments. These treatments are costly. In addition, as compressor exit temperatures climb substantially above 1000° F. (538° C.), the thermally grown oxides within the abradable coatings begin to thicken, which may cause excessive wear to bare blade tips. Thus, there is a continued need in the art for improved abrasive blade tip treatments in modern engines.

SUMMARY

An abrasive coating for a metal airfoil tip in a gas turbine engine may include an abrasive layer having a plurality of grit particles partially coated with a braze alloy and configured for attachment to the airfoil tip.

In an embodiment, an abrasive assembly for a gas turbine engine may include at least one abrasive layer having grit particles partially coated with a braze alloy, and an airfoil having a tip, where the braze alloy is substantially disposed between the at least a set of the grit particles and the tip.

In an embodiment, a method of forming an abrasive layer on a metal airfoil tip in a gas turbine engine includes depositing grit particles coated with a braze alloy on the metal airfoil tip, and heating preselected regions of the tip after depositing to produce a patterned layer of grit particles attached to the tip.

DETAILED DESCRIPTION

Figure 1:
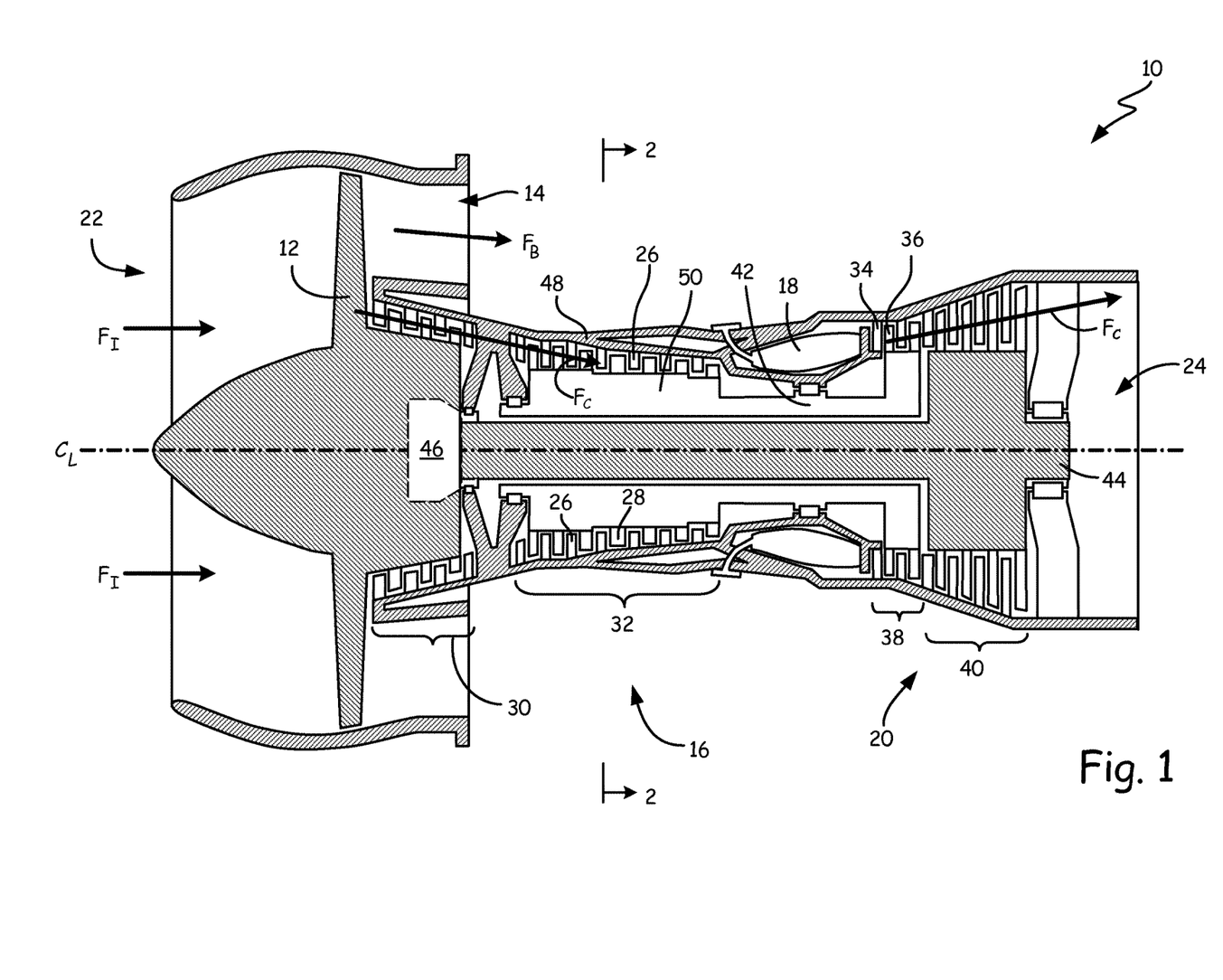
FIG. 1 is a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (HPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on the embodiment, fan 12 also provides some degree of compression (or pre-compression) to core flow $F_C$, and LPC section 30 (or a portion of it) may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36, which convert it to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
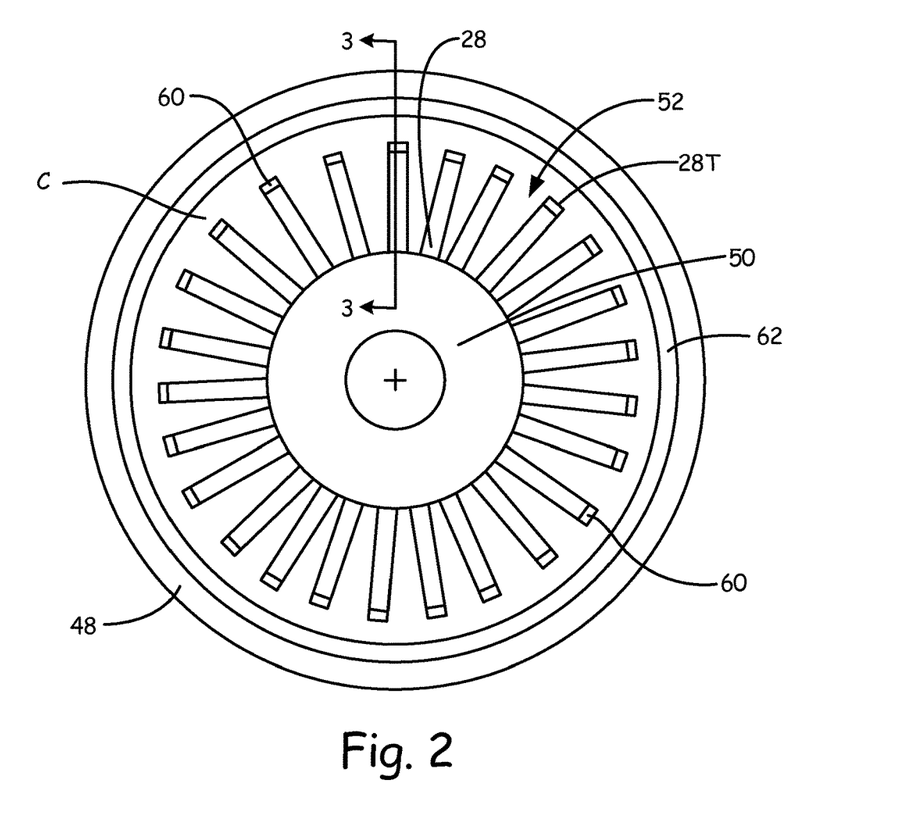
FIG. 2 is a simplified cross-sectional view illustrating the relationship of the rotor and vanes taken along line 2-2 of FIG. 1, not to scale.
Figure 3:
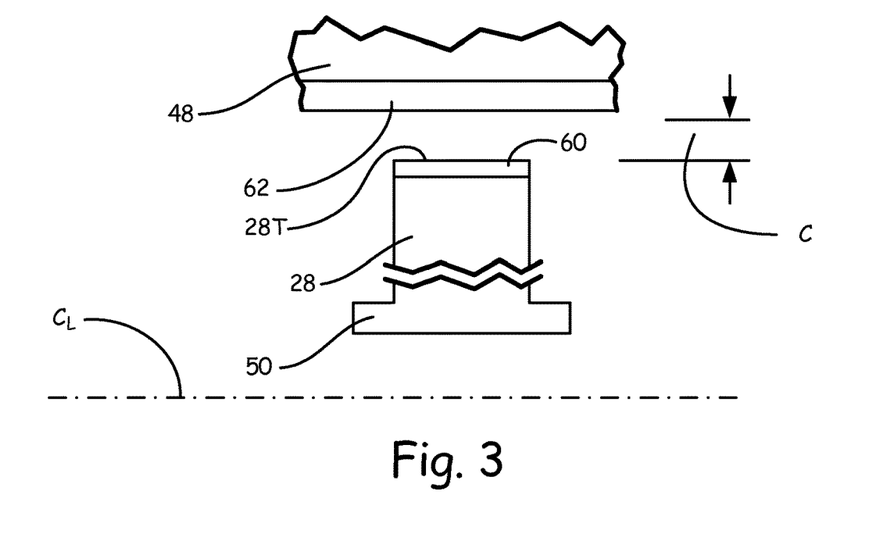
FIG. 3 is a cross-sectional view taken along line 3-3 of FIG. 2, not to scale.

The present disclosure is intended to be used with airfoils in turbine engines. The term "airfoil" is intended to cover both rotor blades and stator vanes. It is the purpose of this disclosure to produce abrasive coatings on the tips of rotors and vanes that create abradable seals with low gas permeability, low roughness and stable dimensions while maintaining abradability during interaction with blades and vanes to increase engine efficiency to acceptable values. The disclosure of FIGS. 2 and 3 illustrates interaction of a rotor blade with a stator casing or shroud. Another embodiment can relate to interaction of a stator vane with a rotor. The abrasive coating disclosed herein may be used with either or both configurations.

FIG. 2 is a cross section along line 2-2 of FIG. 1 of casing 48 which surrounds shaft 50. Blades 28 are attached to rotor shaft 50 and the gas path 52 is shown as the space between blades 28. Abrasive coating 60 of the present disclosure is operatively disposed on blades 28 such that clearance C between abrasive coating 60 at blade tip 28T and abradable coating 62 at casing 48 has the proper tolerance for operation of the engine (e.g., sufficiently small to serve as a seal to prevent leakage of air, and thus increasing efficiency, without interfering with relative movement of the blades and casing. In FIGS. 2 and 3, clearance C is expanded for purposes of illustration. In practice, clearance C may be, for example, in a range of about 25 to 55 mils (635 to 1397 microns) when the engine is cold and 0 to 35 mils (0 to 889 microns) during engine operation depending on the specific operating condition and previous rub events that may have occurred.

FIG. 3 shows the cross section along line 3-3 of FIG. 2, with shaft 50, blade 28, abrasive coating 60, casing 48 and abradable coating 62. Coating 60 is attached to blade 28, with a clearance C between blade tip 28T on coating 60 and coating 62 that varies with operating conditions, as described herein.

Figure 4:
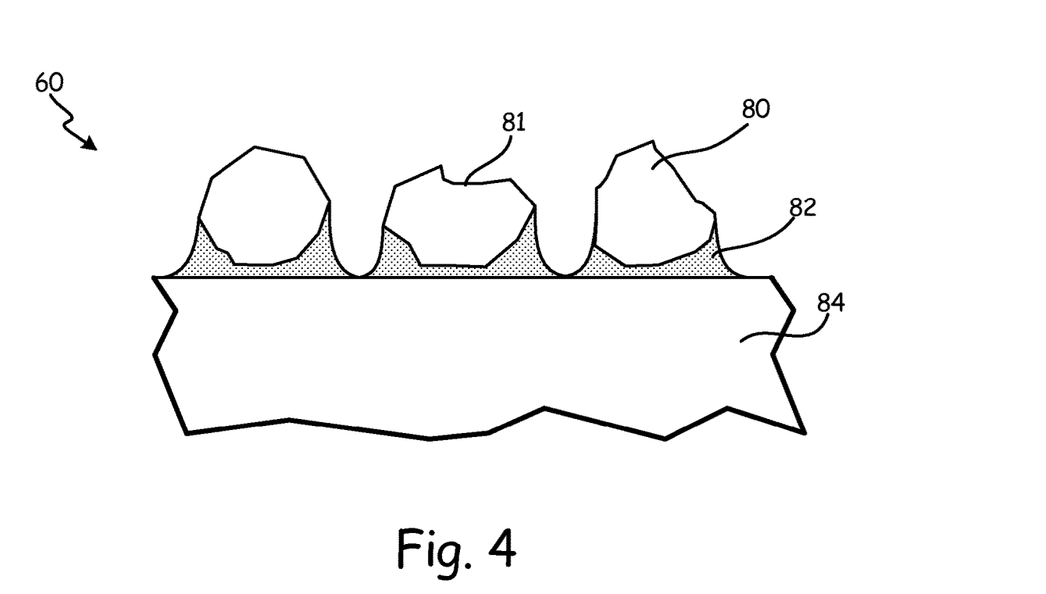
FIG. 4 is a schematic cross-section of the abrasive coating of the invention.

A schematic illustration of abrasive layer 60 of the invention is shown in FIG. 4. Abrasive layer 60 comprises abrasive grit particles 80 and braze alloy 82 on metal substrate 84. In one embodiment, metal substrate 84 may be rotor blade 28 of engine 10. As shown, abrasive grit particles 80 are attached to substrate 84 by a thin layer of braze alloy layer 82 such that cutting surfaces 81 are exposed. Another feature of abrasive layer 60 is that braze alloy layer 82 wets both abrasive grit particles 80 and metal substrate 84 (e.g., blade 28) such that abrasive grit particles 80 are firmly attached to metal substrate 84 through braze alloy layer fillet 82.

As further discussed below, abrasive layer 60 may be formed by powder based additive manufacturing. Braze alloy layer 82 may also be a high temperature superalloy braze alloy. High temperature braze alloys may be in the form of a mixture of two or more braze alloy powders and a solid or liquid binder material. One alloy is a lower melting temperature alloy and the other alloy is a higher melting temperature alloy that may be identical to the substrate alloy. The lower melting braze alloy may be a superalloy containing a melting point depressant such as boron. When the multicomponent braze alloy mixture is heated above the melting point of the lower melting braze alloy but below the melting point of the higher melting alloy and held at a fixed temperature, the melting point depressant addition diffuses out of the braze alloy into the surrounding material. During this process, the liquid temperature of the lower melting alloy constituent increases until the molten braze alloy isothermally solidifies at a higher temperature, closer to the melting point of the high temperature alloy in the braze alloy mixture. In accordance with the present disclosure, this process may create a higher temperature form of abrasive layer 60.

Figure 5:
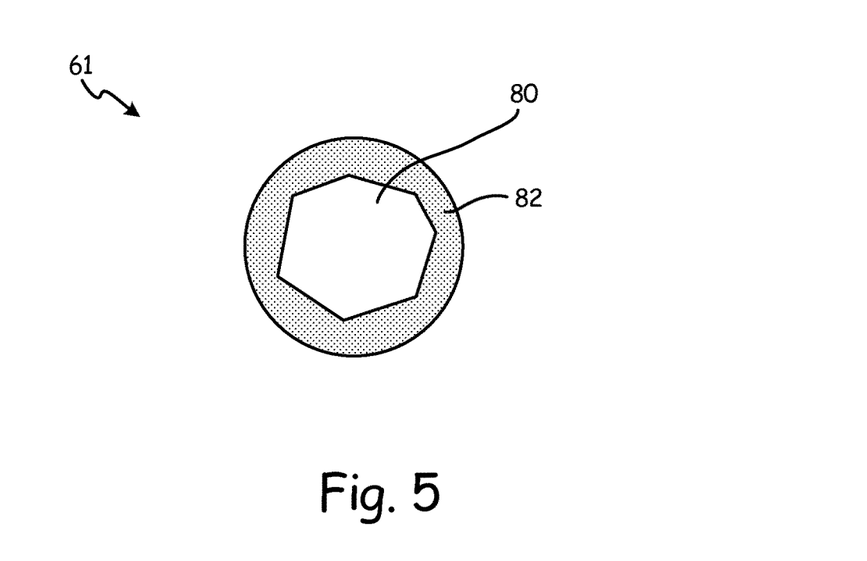
FIG. 5 is a schematic cross-section of a feedstock particle of the invention.

A schematic illustration of powder based additive manufacturing feedstock particle 61 used to form abrasive layer 60 is shown in FIG. 5. Particle 61 comprises abrasive grit particle 80 coated with a layer of braze alloy 82. Braze alloy layer 82 may be in the form of a continuous metal layer or may be in the form of a composite layer of braze alloy powder in a suitable binder such as a polymeric binder. The relative diameters of abrasive grit particle 80 and thickness of braze alloy layer 82 are adjustable such that when a layer of powder feedstock particles 61 formed on substrate 84 is heated to melt braze alloy layer 82 during an additive manufacturing process to be described, the thickness of solidified braze alloy layer 82 is just enough to securely attach grit particles 80, to substrate 84 as shown schematically in FIG. 4.

As noted above, braze alloy layer 82 may be a single component braze alloy in the form of a metal coating on grit particle 80 or may be in the form of a composite powder mixture comprising at least one braze alloy powder and a binder material surrounding grit particle 80. In an embodiment, braze alloy layer 82 may comprise a blend of two metal alloy powders and an organic binder material surrounding grit particle 80 for subsequent transient liquid phase brazing of grit particles 80 to metal substrate 84. Grit particles 80 may be cubic boron nitride (CBN), zirconia, alumina, silicon carbide, diamond and others known and unknown in the art, and may have a particle size (e.g., diameter) ranging from about 20 microns to about 200 microns in one embodiment, or from about 50 microns to about 150 microns in another embodiment. Braze alloy 82 may be a blend of at least two nickel base alloy powders, wherein the first powder is a low melting temperature nickel base brazing alloy and the second powder is a high melting temperature nickel base alloy preferably identical to the alloy of substrate 84. Transient liquid phase braze alloys suitable for nickel base and cobalt base alloy substrates are discussed in U.S. Pat. No. 4,008,844, U.S. Pat. No. 6,503,349, and U.S. Pat. No. 7,966,707, all of which patents are hereby incorporated by reference in their entireties. The braze alloys are available under the trademark TURBOFIX. In various embodiments, other braze alloys known and unknown in the art may be employed.

An exemplary process of forming abrasive layer 60 of the invention comprises spreading a layer of composite particles 61 on substrate 84. Heating layer 61 (FIG. 5) to melt braze alloy layer 82 forms abrasive layer 60 (FIG. 4) comprising grit particles 60 securely attached to substrate 84 by a thin layer of braze alloy 82 following solidification of molten braze alloy layer 82. If braze alloy 82 is a high temperature braze alloy requiring further transient liquid phase consolidation, a second heat treatment is required. The second heat treatment remelts the lower melting component of the two-phase braze alloy composition. Maintaining a temperature higher than the liquid temperature of the molten braze alloy allows a melting point depressant to diffuse out of the braze alloy and allows the braze alloy to isothermally solidify to form a higher temperature abrasive coating.

Figure 6:
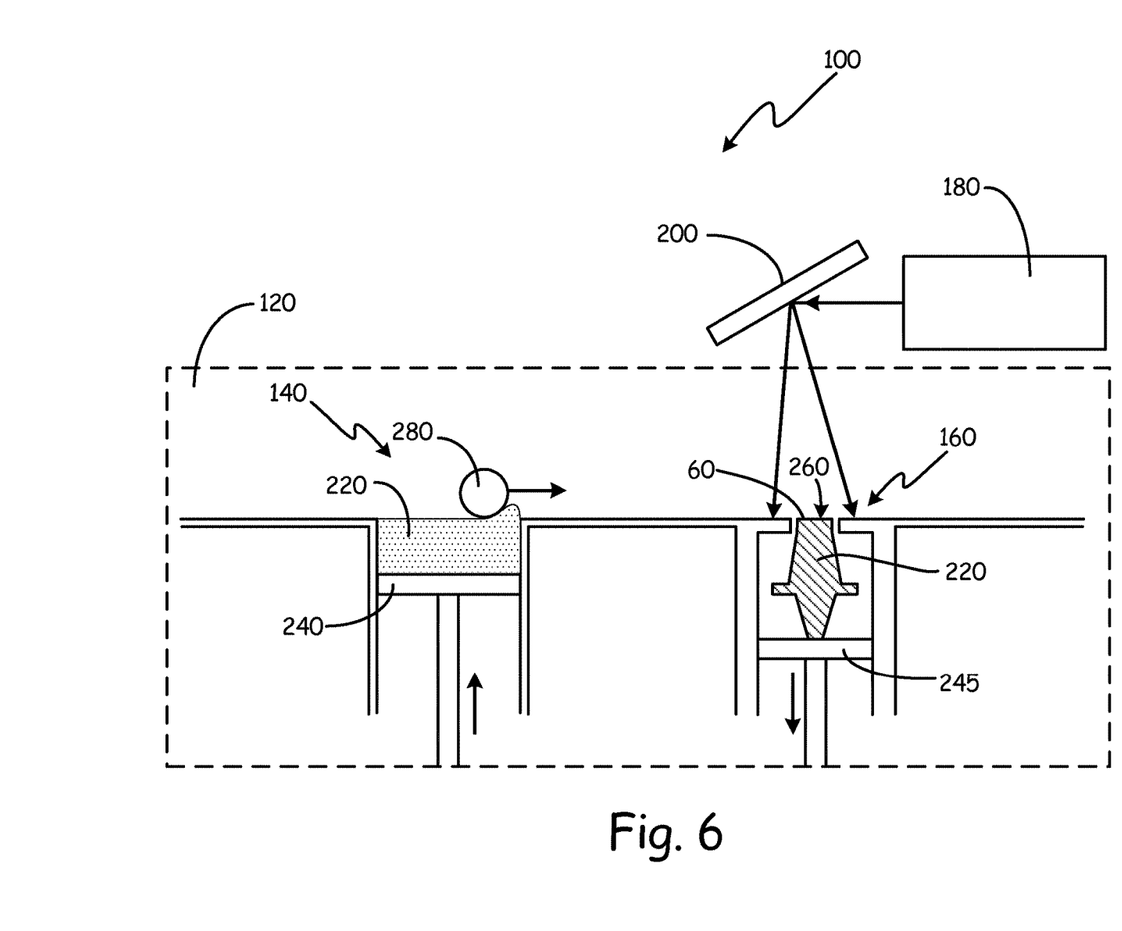
FIG. 6 is a schematic of a powder based additive manufacturing process.

In accordance with the present disclosure, abrasive layer 60 may be formed by powder based additive manufacturing. An example of a powder based additive manufacturing system suitable for use with exemplary embodiments and methods of the disclosure is shown in FIG. 6. System 100 includes manufacturing chamber 120 equipped to produce solid freeform objects by additive manufacturing, such as, for example, selective laser brazing (SLB). System 100 comprises powder storage chamber 140, build chamber 160, laser 180, and scanning mirror 200. During operation of system 100, powder 220 is fed upward by piston 240 and is spread over build chamber surface 260 by roller 280 after piston 245 moves downward one layer thickness. An example of powder 220 of the invention is feedstock powder 61 shown in FIG. 5.

After a single layer of powder 220 (powder 61) is spread in an even layer on build chamber surface 260, and laser 180 and scanning mirror 200 are activated to form brazed abrasive layer 60 on tip of airfoil 220 (e.g., blade 28) mounted and fixtured in build chamber 160. It will be appreciated that the shape of brazed abrasive layer 60 on the tip of airfoil 220 may be stored by a computer file in a memory of a computer of system 100, and created using example system 100.

If a second layer of brazed abrasive layer 60 is required, platform 240 in build chamber 160 may index down one layer thickness and platform 240 may index up one layer thickness and the process repeated whereby brazed abrasive layer 60 is applied to preformed airfoil 220. In accordance with various embodiments, airfoil 220 and abrasive layer 60 may be completely formed with system 100 as schematically shown in FIG. 6.

Figure 7:
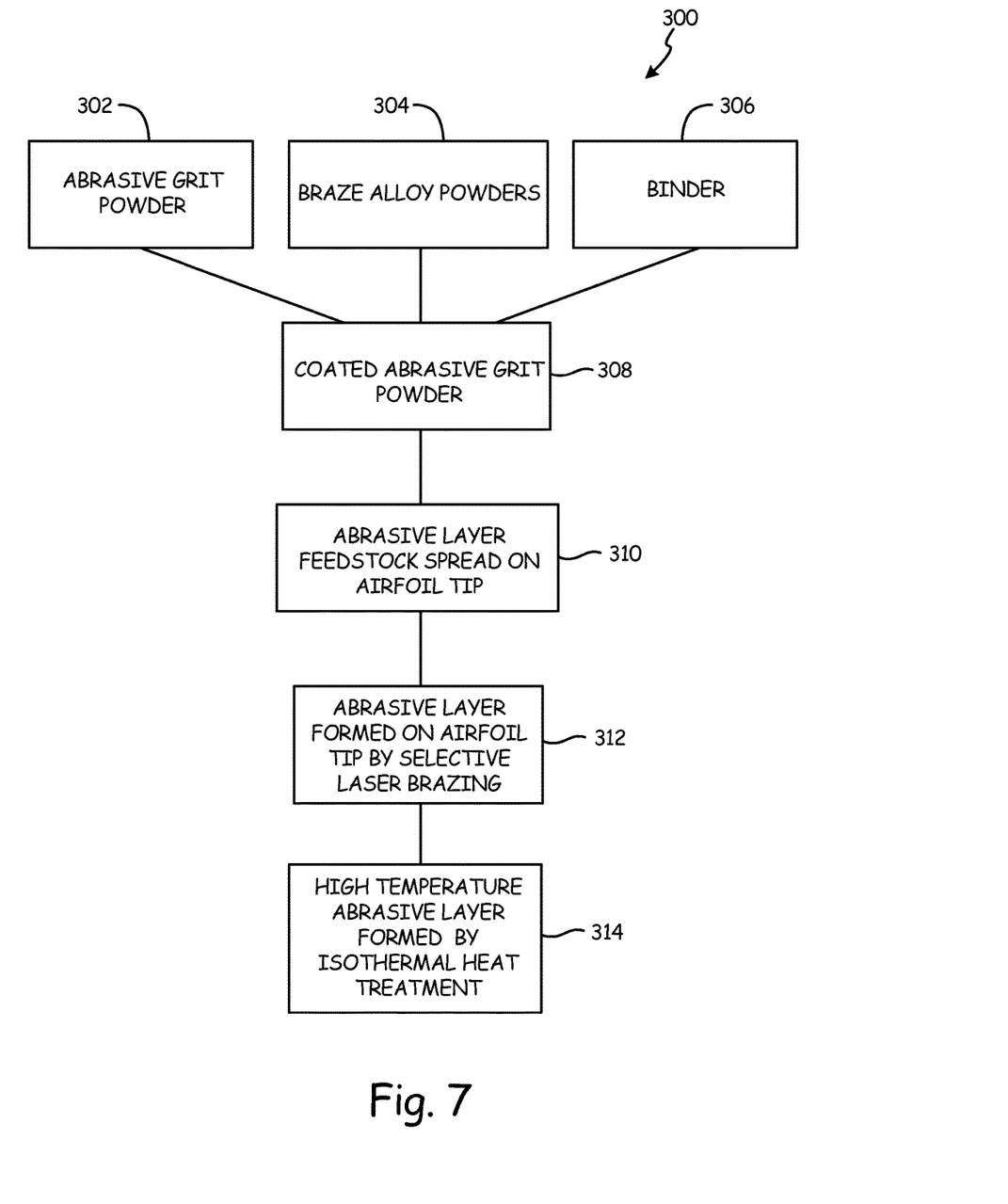
FIG. 7 is a flowchart illustrating the additive manufacturing process of the invention.

Referring to FIG. 7, a powder based additive manufacturing process 300 is shown in accordance with the present disclosure. Starting materials for the process include abrasive grit powder at block 302, braze alloy powder at block 304, and a binder at block 306. Appropriate abrasive grit powders include cubic boron nitride (CBN), zirconia, alumina, silicon carbide, and diamond. Suitable braze alloys, as mentioned before, are among those discussed in U.S. Pat. Nos. 4,008,844, 6,503,349, and 7,966,707, which are hereby incorporated by reference in their entireties, and are available under the trademark TURBOFIX. Liquid or solid binder materials are added to the braze alloy and grit powders such that when the components are mixed together, the fine braze alloy powders combine with the binder to form coated grit particle 61 at block 308. Common binder materials include organics such as acrylics, alcohols, and others known in the art.

The braze alloy is then coated with grit particle feedstock dispersed on an air foil fixtured in an additive manufacturing apparatus such that the tip of the airfoil is covered with a single layer of particles 61 at block 310. An energy beam, such as a laser, is then scanned over the powder coated airfoil tip to melt the braze alloy coating on the powder to form a molten braze alloy layer that solidifies to bond grit particles 80 to airfoil 220 to form abrasive layer 60 at block 312. The volume ratio of braze alloy coating 82 to grit particle 80 may be adjusted such that, when molten braze alloy 82 solidifies, grit particles 80 are securely attached to airfoil 220 such that cutting surfaces 81 on the grit particles are exposed as schematically shown in FIG. 4. In an example, the grit particles may only cover about 10% of the surface of the blade tip, for instance, as a narrow stripe down the center of the blade tip.

If isothermal diffusion brazing is used to form abrasive layer 60 on airfoil 84, braze alloy layer 82 may contain a low melting temperature powder component and a higher melting temperature powder component. An isothermal heat treatment at a temperature above the melting point of the lower temperature component but below the melting point of the higher temperature component may yield, upon final solidification, a desirable higher temperature abrasive coating of the invention at block 314.

Discussion of Possible Embodiments

The following are non-exclusive descriptions of possible embodiments of the present invention.

An abrasive coating for a metal airfoil tip in a gas turbine engine may include an abrasive layer having a plurality of grit particles partially coated with a braze alloy and configured for attachment to the airfoil tip.

The abrasive coating of the preceding paragraph can optionally include, additionally and/or alternatively, any one or more of the following features, configurations and/or additional components:

A further embodiment of the abrasive coating, wherein the grit particles are selected from the group consisting of cubic boron nitride (CBN), zirconia, alumina, silicon carbide, and diamond.

A further embodiment of one or more foregoing abrasive coating, wherein the grit particles comprise CBN.

A further embodiment of one or more foregoing abrasive coating, wherein the braze alloy comprises a nickel base, cobalt base, or iron base braze alloy or mixtures thereof, or a titanium braze alloy.

A further embodiment of one or more foregoing abrasive coating, wherein the braze alloy wets the grit particles and the airfoil tip.

A further embodiment of one or more foregoing abrasive coating, wherein the braze alloy layer thickness is less than the mean grit particle diameter.

A further embodiment of one or more foregoing abrasive coating, wherein the grit particles have a particle size ranging from about 20 microns to about 200 microns.

A further embodiment of one or more foregoing abrasive coating, wherein the grit particles have a particle size ranging from about 50 microns to about 150 microns.

An assembly for a gas turbine engine may include at least one abrasive layer having a plurality of grit particles partially coated with a braze alloy, and an airfoil having a tip, wherein the braze alloy is substantially disposed between at least a set of the plurality of grit particles and the tip.

The assembly of the preceding paragraph can optionally include, additionally and/or alternatively, any one or more of the following features, configurations and/or additional components:

A further embodiment of the assembly, wherein the airfoil comprises a nickel base, a cobalt base, an iron base superalloy or mixtures thereof or a titanium alloy.

A further embodiment of one or more foregoing assembly, wherein the grit particles are selected from the group consisting of cubic boron nitride (CBN), zirconia, alumina, silicon carbide, and diamond.

A further embodiment of one or more foregoing assembly, wherein the braze alloy comprises a nickel base, cobalt base, or iron base braze alloy or mixtures thereof, or a titanium braze alloy.

A further embodiment of one or more foregoing assembly, wherein the braze alloy wets the set of grit particles and the airfoil tip.

A further embodiment of one or more foregoing assembly, wherein the braze alloy layer thickness is less than the mean grit particle diameter.

A method of forming an abrasive layer on a metal airfoil tip in a gas turbine engine may include depositing a plurality of grit particles coated with a braze alloy on the metal airfoil tip, and heating preselected regions of the tip after the depositing to produce a patterned layer of grit particles attached to the airfoil tip.

The method of the preceding paragraph can optionally include, additionally and/or alternatively, any one or more of the following features, configurations and/or additional components/steps:

A further embodiment of the method, wherein the grit particles are selected from the group consisting of cubic boron nitride (CBN), zirconia, alumina, silicon carbide, and diamond.

A further embodiment of one or more foregoing method, wherein the braze alloy comprises a nickel base, cobalt base, or iron base braze alloy or mixtures thereof, or a titanium braze alloy.

A further embodiment of one or more foregoing method, wherein heating preselected regions of the tip comprises directing an energy beam to melt the braze alloy to produce the patterned layer of grit particles attached to the airfoil tip.

A further embodiment of one or more foregoing method, wherein the energy beam is a laser or electron beam.

A further embodiment of one or more foregoing method, wherein the patterned layer of grit particles is attached to the airfoil tip by a braze alloy layer after the molten braze alloy solidifies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming an abrasive layer on an outermost radial tip surface of a metal airfoil in a gas turbine engine, the outermost radial tip surface being configured as the only portion of the metal airfoil to form an abradable seal with a shroud during operation of the engine, the method comprising:

depositing a plurality of grit particles coated with a braze alloy on the outermost radial tip surface of the metal airfoil; and heating preselected regions of the outermost radial tip surface after the depositing by directing an energy beam to melt the braze alloy to produce an areal patterned layer of grit particles attached to the outermost radial tip surface;

wherein the areal patterned layer of grit particles consists of a stripe down a center of the outermost radial tip surface of the metal airfoil.

2. The method of claim 1, wherein the grit particles are selected from the group consisting of cubic boron nitride (CBN), zirconia, alumina, silicon carbide, and diamond.

3. The method of claim 1, wherein the braze alloy comprises a nickel base, cobalt base, or iron base braze alloy or mixtures thereof, or a titanium base braze alloy.

4. The method of claim 1, wherein the energy beam is a laser or electron beam.

5. The method of claim 1, wherein the patterned layer of grit particles is attached to the outermost radial tip surface by a braze alloy layer after the molten braze alloy solidifies.

6. The method of claim 1 wherein the areal patterned layer covers 10 percent of the outermost radial tip surface of the metal airfoil.

* * * * *